United States Patent [19]
Sato et al.

[11] 4,195,136
[45] Mar. 25, 1980

[54] IMPACT-RESISTANT STYRENE RESIN COMPOSITION

[75] Inventors: Yasushi Sato, Yokohama; Toshio Ibaragi, Kawasaki; Masanobu Ishihara, Yokosuka; Makoto Honda, Tokyo, all of Japan

[73] Assignee: Asahi Kasei Kogyo Kabushiki Kaisha, Osaka, Japan

[21] Appl. No.: 945,320

[22] Filed: Sep. 25, 1978

[51] Int. Cl.² .................... C08L 51/04; C08L 53/02
[52] U.S. Cl. .................................. 525/71; 525/89; 525/98
[58] Field of Search .................... 260/876 B, 876 R

[56] References Cited

U.S. PATENT DOCUMENTS

| | | | |
|---|---|---|---|
| 3,907,929 | 9/1975 | Durst | 260/876 B |
| 3,907,930 | 9/1975 | O'Grady | 260/876 B |
| 3,936,365 | 2/1976 | Saunders et al. | 260/876 R X |
| 4,073,831 | 2/1978 | Tabana et al. | 260/876 R |

FOREIGN PATENT DOCUMENTS

| | | | |
|---|---|---|---|
| 2453110 | 5/1975 | Fed. Rep. of Germany | 525/71 |
| 726583 | 3/1955 | United Kingdom | 525/86 |

OTHER PUBLICATIONS

*Multicomponent Polymer Systems* (Advances in Chem. Series 99), N.J. Platzer (A.C.S. 1971), pp. 237–259.

*Primary Examiner*—J. Ziegler
*Attorney, Agent, or Firm*—Armstrong, Nikaido, Marmelstein & Kubovcik

[57] ABSTRACT

The disclosure relates to a resin composition comprising (A) 75–98 parts by weight of a block copolymer mixture of vinyl aromatic hydrocarbon and conjugated diolefin and (B) 25–2 parts by weight of an impact-resistant styrene resin, characterized in that said copolymer mixture (A) is a mixture of a copolymer (1) and a copolymer (2) (the weight ratio of the copolymer (1) to the copolymer (2) is 1.5 or more), the copolymer (1) being a copolymer which contains 55–85% by weight of vinyl aromatic hydrocarbon, consists of at least one vinyl aromatic hydrocarbon polymer block and at least one conjugated diene polymer block, and has a number average molecular weight of about 10,000 to about 500,000 and the copolymer (2) being a homopolymer of vinyl aromatic hydrocarbon or a copolymer which consists of at least one vinyl aromatic hydrocarbon polymer block and at least one conjugated diene polymer block, the vinyl aromatic hydrocarbon content of said copolymer being 75% by weight or more and at least 5% by weight higher than that of the copolymer (1), said homopolymer or copolymer having a number average molecular weight of about 500 to about 130,000, both of said copolymer (1) and said copolymer (2) being obtained by polymerization in an inert organic solvent with an organolithium compound as a catalyst; and that said impact-resistant styrene resin (B) is a polymer obtained by graft-polymerizing 3–12% by weight of a rubbery conjugated diene polymer and 97–88% by weight of a vinyl aromatic hydrocarbon. The said resin composition is far superior to conventional resin compositions of similar type in balance between impact resistance and transparency.

12 Claims, 1 Drawing Figure

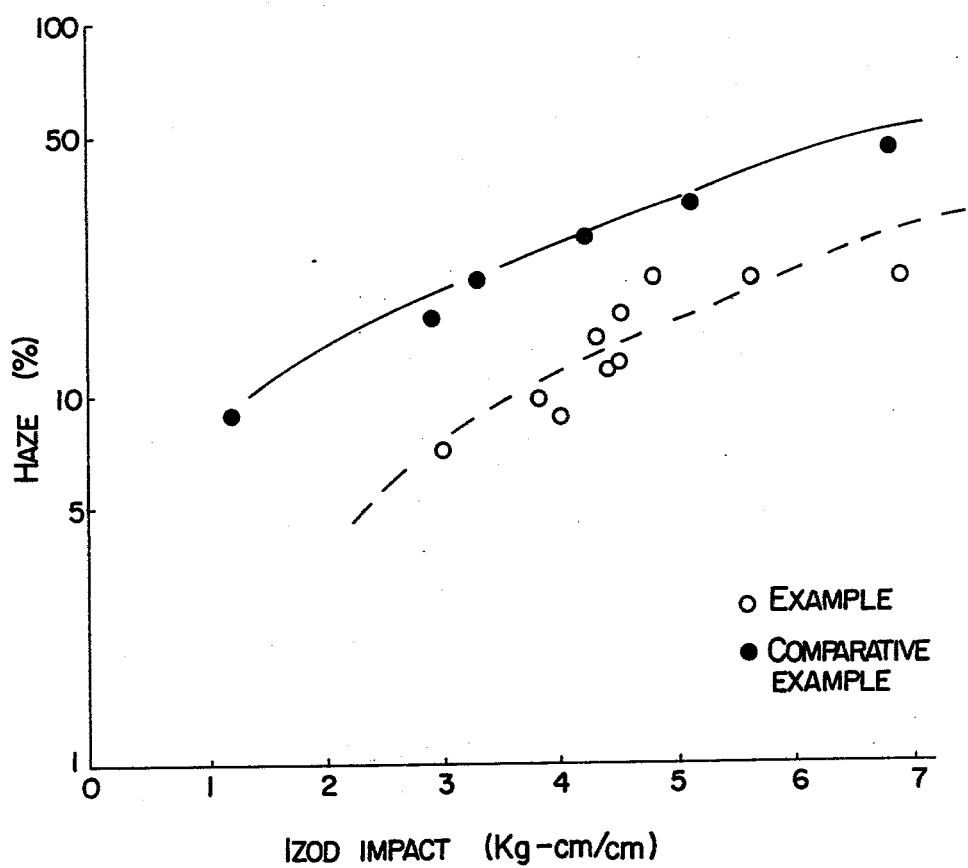

IMPACT-RESISTANT STYRENE RESIN COMPOSITION

BACKGROUND OF THE INVENTION

1. Field of the Invention

This invention relates to a resin composition consisting of a block copolymer mixture of vinyl aromatic hydrocarbon and conjugated diene and an impact-resistant styrene resin, and having an excellent transparency and an excellent impact strength.

2. Description of the Prior Art

A variety of production processes and compositions have hitherto been proposed concerning vinyl aromatic hydrocarbon polymer resins typified by styrene resin. Most of the proposals are concerned with improvement in impact-resistance of general purpose polystyrene, because it is brittle and poor in impact-resistance though it is excellent in transparency, surface gloss, beautifulness of appearance, stiffness and tensile strength. There have hitherto been attempted incorporation of a special rubbery copolymer into the general purpose polystyrene, production of an impact-resistant polystyrene resin by graft-polymerization of monomeric styrene on rubbery polymer, production of a styrene-butadiene block copolymer having a high styrene content, etc.

As examples of the incorporation of a special rubbery polymer into general purpose polystyrene, Japanese Patent Publication No. 7126/69 discloses incorporating a linear block copolymer into general purpose polystyrene; and Japanese Patent Application Kokai (Laid-Open) No. 25043/74 and U.S. Pat. No. 3,853,978 disclose a composition of a general purpose polystyrene and a vinyl aromatic hydrocarbon-conjugated diene block copolymer having a special block structure and having a relatively high vinyl aromatic hydrocarbon content. The impact resistance of these compositions are somewhat improved as compared with polystyrene, but cannot be said to be sufficient, and the deterioration in stiffness and transparency is remarkable.

The impact-resistant polystyrene resin in which monomeric styrene is graft-polymerized on a rubbery polymer can be obtained by dissolving a rubbery polymer into monomeric styrene and polymerizing the latter by bulk polymerization, suspension polymerization or by combination of bulk and suspension polymerizations. This type of impact-resistant polystyrene has an excellent resistance to impact. However, it is entirely opaque and poor in surface gloss.

A styrene-butadiene block copolymer having a high styrene content can be obtained by living anionic polymerization. It is formed by polymerizing styrene and butadiene alternately in an inert solvent with an anionic polymerization initiator such as organolithium compound as in Japanese Patent Publications Nos. 3252/72 and 2423/73, etc. This type of block copolymer having a high styrene content is excellent in transparency and superior to general purpose polystyrene in impact-resistance. Though this type of block copolymer fulfils our requirements to some extent, it is still insufficient in impact-resistance, so that the application field thereof is limited.

As mentioned above, among the impact-resistant polystyrenes so far proposed, some are excellent in impact-resistance but are poor in transparency, and the others are excellent in transparency but are poor in improvement of impact resistance. Thus, there has been discovered no impact-resistant polystyrene in which physical properties including impact resistance are well balanced with transparency.

The present inventors previously proposed a styrene resin composition having excellent transparency and excellent impact resistance on the basis of a conception and a knowledge entirely different from those in the past (cf. Japanese Patent Publications Nos. 5,059/78 and 15,958/78 and Australian Pat. No. 488,065). This composition is a styrene resin composition consisting of:

(1) a copolymer consisting of at least one vinyl aromatic hydrocarbon polymer block and at least one conjugated diene polymer block, and having a vinyl aromatic hydrocarbon content of 55–85% by weight, and (2) a copolymer consisting of at least one vinyl aromatic hydrocarbon polymer block and at least one conjugated diene polymer block, and having a vinyl aromatic hydrocarbon content of 75% by weight or more, or a homopolymer of vinyl aromatic hydrocarbon, both copolymers (1) and (2) being obtained in an inert organic solvent with an organolithium compound as a catalyst, characterized in that the weight ratio of copolymer (1)/copolymer (2) is not less than 1.5/1 and that at least 35% of the polymer chain of copolymer (1) is substantially identical in structure with the polymer chain of copolymer (2). Contrary to the prior conception that a mixture of polymers having different compositions is inferior in transparency to the original polymers, this composition is completely transparent and has resistance to impact.

However, even this block copolymer mixture cannot still be said to be fully satisfactory in respect of impact resistance. Although it is comparable or superior in impact resistance to the conventional mixture of general purpose polystyrene and rubbery polymer or to the conventional block copolymers having a high styrene content, a resin having a much more excellent impact resistance has been desired.

For the purpose of improving the impact resistance of a styrene-butadiene block copolymer, attempts have been made to incorporate an impact-resistant polystyrene resin into such a block copolymer (Japanese Patent Publication No. 16,496/77) or to incorporate an impact-resistant polystyrene resin and polystyrene into such a block copolymer (Japanese Patent Application Kokai (Laid-Open) No. 89,550/76). However, the resulting compositions have not necessarily been satisfactory as compositions having both excellent transparency and excellent impact strength.

In view of the above problems, the present inventors have conducted extensive research to find a new styrene resin composition which is excellent in both transparency and impact resistance.

SUMMARY OF THE INVENTION

It is an object of this invention to provide a styrene resin composition which is superior to the hitherto known products in both transparency and impact resistance.

Other objects and advantages of this invention will become apparent from the following description.

According to this invention, there is provided a resin composition consisting of (A) 75 - 98 parts by weight of a mixture of block copolymers of a vinyl aromatic hydrocarbon and a conjugated diene and (B) 25 - 2 parts by weight of an impact-resistant styrene resin, wherein said copolymer mixture (A) is a mixture of copolymer (1) and copolymer (2), the weight ratio of copolymer (1) to copolymer (2) being 1.5 or more, said copolymer (1) being a copolymer consisting of at least one vinyl aromatic hydrocarbon polymer block and at least one conjugated diene polymer block, and having a vinyl aromatic hydrocarbon content of 55–85% by weight and a number average molecular weight of about 10,000 to about 500,000, and said copolymer (2) being a homopolymer of a vinyl aromatic hydrocarbon or a copolymer consisting of at least one vinyl aromatic hydrocarbon polymer block and at least one conjugated diene polymer block, and having a vinyl aromatic hydrocarbon content of 75% by weight or more, which is at least 5% higher than that in copolymer (1), said copolymer and homopolymer both having a number average molecular weight of about 500 to about 130,000, said copolymer (1) and said copolymer (2) being both obtained by polymerization in an inert organic solvent with an organolithium compound as catalyst;

and said impact-resistant styrene resin (B) being a polymer obtained by graft-polymerizing 97–88% by weight of a vinyl aromatic hydrocarbon on 3–12% by weight of a rubbery conjugated diene polymer.

BRIEF DESCRIPTION OF THE DRAWING

The drawings accompanying this application illustrates a relationship between transparency and impact-resistance as to the compositions consisting of a block copolymer mixture and an impact-resistant styrene resin, obtained in the Examples and the Comparative Examples which appear hereinafter.

DETAILED DESCRIPTION OF THE INVENTION

In the composition of this invention, the characteristic feature of this invention is most plainly exhibited when the weight ratio of the block copolymer mixture to the impact-resistant styrene resin is in the range of 98/2 to 75/25. When the weight ratio is in the range of 98/2 to 90/10, the haze (%) of the composition can be kept at about 12 or less, which means that the transparency of the block copolymer mixture itself is hardly injured. As mentioned above, compositions having a weight ratio of 98/2 to 90/10 have an excellent transparency and, in addition, the impact-resistance thereof is improved as compared with the block copolymer mixture per se. On the other hand, compositions having a weight ratio of 90/10 to 75/25 have a haze exceeding 12%, but are remarkably improved in impact-resistance and simultaneously improved in stiffness and heat deformation temperature.

Hitherto, conjugated diene-vinyl aromatic hydrocarbon block copolymers having a high vinyl aromatic hydrocarbon content have been considered superior in impact resistance to general purpose polystyrene but their impact-resistance cannot be said to be satisfactory, so that their use has been limited. The composition of this invention wherein the weight ratio of the block copolymer mixture to the impact-resistant styrene resin is 98/2 to 75/25 can be used in a broad range owing to its excellent impact resistance. By varying the composition ratio in accordance with the balance between impact resistance and transparency which is required for the molded product, resin compositions having various characteristic properties enough to satisfy the requirement can be provided.

The composition of this invention can be made into a resin having well-balanced characteristics, particularly a resin excellent in both impact resistance and transparency, by selecting a composition ratio in accordance with the intended characteristic properties.

The two block copolymers (1) and (2) used in this invention are block copolymers obtainable by anion-polymerizing the monomers in an inert organic solvent with an organolithium compound as a catalyst. The block copolymer (1) is a copolymer consisting of at least one vinyl aromatic hydrocarbon polymer block and at least one conjugated diene polymer block, and its vinyl aromatic hydrocarbon content is in the range of 55–85% by weight. If the vinyl aromatic hydrocarbon content is less than 55%, its resinous properties are injured and ultimately the hardness and stiffness characteristic of the composition of this invention are injured, which is undesirable. If the vinyl aromatic hydrocarbon content exceeds 85% by weight, the product cannot have an excellent impact resistance though its hardness and stiffness are improved. The preferable copolymers (1) usable in the block copolymer mixture are represented by the following general formulas:

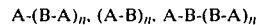

wherein A represents a block composed mainly of vinyl aromatic hydrocarbon; B represents a polymer block composed mainly of conjugated diene; and n is a number of 1 or more. When n is 5 or more, the procedure of polymerization is so complicated that its industrial practice is disadvantageous. The block copolymer represented by the aforementioned general formulas may be the so-called perfect block copolymer or the so-called tapered block copolymer. The concrete process for its production may be any process hitherto known. For example, a block copolymer represented by $A\text{-}(B\text{-}A)_n$ can be produced by first forming the block A with an organolithium compound as catalyst, then forming the block B and thereafter forming the block A, namely by the successive addition of monomers (Japanese Patent Publication No. 19286/61). It can also be produced by a process which comprises mixing the monomers constituting the blocks A and B and polymerizing the monomer mixture so as to form a tapered block copolymer such as $(A\text{-}B)_n$ by the utilization of monomer reactivity ratio (Japanese Patent Publication No. 17979/68 or British Pat. No. 1,130,770). The radial block copolymer represented by the general formula $A\text{-}B\text{-}(B\text{-}A)_n$ can be obtained by coupling a living block copolymer A-B⊖ with a polyfunctional coupling agent such as polyhalogenides, diester compounds and the like.

In the block copolymer mixture, copolymer (1) has a number average molecular weight of about 10,000 to about 500,000, preferably about 30,000 to about 300,000, from the viewpoint of excellent mechanical properties of the composition obtainable therefrom.

In the block copolymer mixture, the copolymer (2) is a homopolymer or copolymer produced by anionic polymerization with an organolithium compound catalyst, said copolymer consisting of at least one vinyl aromatic hydrocarbon polymer block and at least one conjugated diene polymer block, and having a vinyl aromatic hydrocarbon content of 75% by weight or more, which is higher than the vinyl aromatic hydrocarbon content in the copolymer (1). If the vinyl aromatic hydrocarbon content is less than 75% by weight, the final composition obtainable therefrom loses its resinous character and is injured in hardness and tensile strength, which is undesirable. The vinyl aromatic hydrocarbon content in the copolymer (2) should be at least 5% by weight higher, preferably 10% by weight higher, than that in the copolymer (1), from the viewpoint of excellent transparency of the composition obtainable therefrom. The block structure of the copolymer (2) consisting of at least one vinyl aromatic hydrocarbon polymer block and at least one conjugated diene polymer block can be represented by the same general formulas as mentioned in respect to the copolymer (1), and it may be produced by any hitherto known method.

In the block copolymer mixture, the copolymer (2) has a number average molecular weight of about 500 to about 130,000, preferably about 10,000 to about 100,000, more preferably 10,000 to 80,000, from the viewpoint of the excellent transparency of the final composition obtainable therefrom.

In the block copolymer mixture of this invention, the weight ratio of the copolymer (1) to the copolymer (2) is 1.5 or more. If the ratio is less than 1.5, the transparency of the mixture is injured which in turn reduces the transparency of the final composition, which is undesirable.

In the block copolymer mixture, it is preferable that at least 35% of the chain of the copolymer (1) has a substantially identical structure with the chain of the copolymer (2), although this invention is not necessarily limited thereto.

The term "substantially identical structure" herein used means that the conditions determining a polymer such as molecular weight, molecular weight distribution, micro-structure, degree of branching, block structure (the style of linkage between vinyl aromatic hydrocarbon and conjugated diene), etc. are identical within the controllable range of working conditions or the range of analytical error. Diagrammatically, it means that in the following diagrams:

Molecular chain of the copolymer (1)  

Molecular chain of the copolymer (2)  

both the shaded parts are identical in structure. If the shaded part occupies only less than 35% of the chain of the copolymer (1), both the polymers are poor in compatibility so that transparency of the composition is injured. A composition in which at least 35% of the chain of the copolymer (1) is substantially identical in structure with the chain of the copolymer (2) may be produced by any known process, so far as it can give the composition specified above. Concretely speaking, the copolymer (2) may be produced by just the same process as employed for producing a part of the copolymer (1). That is to say, the block copolymer mixture of this invention may be produced by producing the copolymer (2) with the same catalyst, solvent and monomer and under the same polymerization conditions (temperature, pressure, monomer charging rate, etc.) as in the case of the copolymer (1) and then blending the resulting copolymer (2) with the copolymer (1) in the state of solution, pellet or the like by the conventional procedure. The most recommendable process for the production of the block copolymer mixture of this invention comprises first producing a part of the copolymer (1) by anionic polymerization followed by producing the copolymer (2) in the same polymerization system and under the same conditions while continuing the production of the copolymer (1). Since the anionic polymerization with an organolithium compound catalyst enables the molecular design to be made relatively readily and quantitatively, it is suitable for obtaining polymer mixtures having such a restricted structure as in the block copolymer mixture used in this invention.

The inert solvent used in the production of the copolymers (1) and (2) constituting the block copolymer mixture of this invention may be any solvent, so far as it does not inactivate the organolithium compound. Preferable examples of said solvent include aromatic hydrocarbons such as benzene, ethylbenzene, tolene, xylene and the like; alicyclic hydrocarbons such as cyclohexane, methylcyclohexane, ethylcyclohexane and the like; and aliphatic hydrocarbons such as hexane, heptane, isopentane and the like. It is also permissible to add a small quantity of a polar compound to the solvent in order to enhance the polymerization velocity or in order to change the monomer reactivity ratio between butadiene and styrene with the aim of obtaining a block copolymer having an intended structure. Examples of said polar compound include ethers such as tetrahydrofuran, dimethyl ether and the like; and tertiary amines such as triethylamine.

In producing the block copolymers used in this invention, it is preferable to employ a solvent composed mainly of aliphatic hydrocarbon as the inert solvent. As compared with aromatic and alicyclic hydrocarbons, aliphatic hydrocarbons have less toxicity to human body and are less capable of causing photochemical smog when distributed in the atmospheric air. When the block copolymer mixture used in this invention is produced by polymerization in an aliphatic hydrocarbon, it is necessary to effect the polymerization in the state that the resulting copolymer is dispersed in the form of fine particles in the medium because a copolymer having a high vinyl aromatic hydrocarbon content is not dissolved in the aliphatic hydrocarbon solvent. Since a dispersion has only a low viscosity, the motive power necessary for the agitation of polymerization vessel and for the transportation of solution can be saved by the dispersion polymerization, which is a merit of this polymerization.

When the block copolymer mixture used in this invention is produced in an aliphatic hydrocarbon solvent, it is preferable to produce the mixture in one polymerization system by the two step polymerization method in which the organolithium compound is twice supplied. By this technique, the block copolymer mixture can be obtained in the form of a stable dispersion. More concretely speaking, the polymerization is preferably carried out in the following manner.

In a solvent composed mainly of an aliphatic hydrocarbon, (i) a vinyl aromatic hydrocarbon and a conjugated diene are polymerized in a weight ratio of 0/100 to 60/40 in an amount of 1 to 80% by weight of the total weight of the monomers to be used in all the steps with an organolithium compound catalyst to produce:

(a) an active polymer of the conjugated diene, or
(b) an active polymer consisting of a random copolymer of the conjugated diene and the vinyl aromatic hydrocarbon, or
(c) an active polymer consisting of at least one vinyl aromatic hydrocarbon polymer block and at least one conjugated diene polymer block, and (ii) subsequently the residual monomers having a weight ratio of the vinyl aromatic hydrocarbon to the conjugated diene of 100/0 to 75/25 and a fresh organolithium compound are added to the active polymer obtained in (i) and polymerization is effected to produce:
(d) a homopolymer of the vinyl aromatic hydrocarbon, or
(e) a copolymer consisting of at least one vinyl aromatic hydrocarbon polymer block and at least one conjugated diene polymer block, while prolonging the polymer chain of the active polymer obtained in (i). The composition comprising the block copolymer mixture produced by polymerization in such a hydrocarbon solvent exhibits superiority in industrial practice owing to the synergism of the excellent physical properties and the excellent effect at the time of the production of the block copolymer mixture.

In the case of obtaining the block copolymer mixture by the above-mentioned two-step polymerization method, the vinyl aromatic hydrocarbon content in the copolymer (1) can be determined by the following equation if the copolymerization is complete:

$$\text{Content (\% by weight)} = \frac{B_1 \times (1 + \frac{C_2}{C_1}) + \frac{M_2}{M_1} \times B_2}{1 + \frac{M_2}{M_1} + \frac{C_2}{C_1}}$$

wherein $M_1$, $B_1$ and $C_1$ are, respectively, the weight of the monomers used in the first step polymerization (i), the vinyl aromatic hydrocarbon content (% by weight) in the said monomers, and the molar amount of the effective organolithium compound, and $M_2$, $B_2$ and $C_2$ are those in the second stop polymerization (ii), provided that when an organolithium compound containing n active lithium atoms in one molecule is used, $C_1$ and/or $C_2$ should be multiplied by n.

On the other hand, the vinyl aromatic hydrocarbon content in the copolymer (2) becomes equal to the vinyl aromatic hydrocarbon content in the monomers used in the second step polymerization (ii). The weight ratio of the copolymer (1) to the copolymer (2) in the block copolymer mixture can be determined by the following equation:

$$\frac{\text{Copolymer (1)}}{\text{Copolymer (2)}} = \frac{M_1}{M_2} \times \frac{C_1}{C_2} (1 + \frac{M_2}{M_1} + \frac{C_2}{C_1}) \text{ (weight ratio)}$$

Accordingly, the detailed experimental conditions for the above two-step polymerization method can be determined by using those equations.

The organolithium compounds which can be used for producing the copolymers (1) and (2) of the block copolymer mixture constituting the composition of this invention are organic compounds having at least one lithium atom. Examples of said organolithium compound include, for example, n-propyllithium, isopropyllithium, n-butyllithium, sec-butyllithium, tert-butyllithium, n-pentyllithium, methylcyclohexyllithium, benzyllithium, 1,4-dilithio-n-butane, 1,6-dilithio-n-hexane, stilbene dilithium, oligoisoprenyl dilithium and the like, among which n-butyllithium and sec-butyllithium are most conventional.

The vinyl aromatic hydrocarbons usable in this invention include styrene, o-methylstyrene, p-methylstyrene, m-methylstyrene, α-methylstyrene, p-ethylstyrene, 1,3-dimethylstyrene, vinylnaphthalene, vinylanthracene and the like, among which styrene is most conventional. All these vinyl aromatic hydrocarbons may be used alone or in admixture of two or more.

The conjugated dienes usable in this invention are diolefins having 4 to 8 carbon atoms and one pair of conjugated double bonds. Examples of said conjugated diene include 1,3-butadiene, 2-methyl-1,3-butadiene (isoprene), 2,3-dimethyl-1,3-butadiene, 1,3-pentadiene, 1,3-hexadiene and the like, among which 1,3-butadiene and isoprene are most conventional. All these conjugated dienes may be used alone or in admixture of two or more.

In the production of the copolymers (1) and (2) of the block copolymer mixture constituting the composition of this invention, the temperature of polymerization is in the range of −40° C. to +150° C. and usually in the range of +40° C. to +120° C. Though the period of polymerization time is in the range of 30 minutes to 24 hours, it is usually 1 to 10 hours. The atmosphere of the polymerization system is preferably substituted by an inert gas such as nitrogen gas. Care must be taken of preventing the polymerization system from contamination by impurities capable of inactivating the organolithium catalyst or the active polymer, such as water, oxygen, carbon dioxide and the like.

The impact-resistant styrene resin constituting the composition of this invention may be any graft-copolymer of a vinyl aromatic hydrocarbon on a conjugated diene polymer type rubber. Said impact-resistant styrene resin may be any of the known resins such as mentioned in Japanese Patent Publications Nos. 26287/63; 18948/64 (or British Pat. No. 963,307); and 11633/74. It can be produced by dissolving a conjugated diene polymer rubber in a vinyl aromatic hydrocarbon monomer and then subjecting the resulting solution to bulk polymerization, suspension polymerization or a combination of bulk and suspension polymerizations.

The conjugated diene polymer rubbers usable in the impact-resistant styrene resin include, for example, polybutadiene, polyisoprene, butadiene-styrene random copolymer, butadiene-styrene block copolymer and the like, as well as mixtures thereof.

Examples of the vinyl aromatic hydrocarbon monomers usable in the impact-resistant styrene resin include styrene, o-methylstyrene, m-methylstyrene, p-methylstyrene, α-methylstyrene, dimethylstyrene, p-ethylstyrene, vinylnaphthalene, vinylanthracene and the like, among which styrene is most conventional. Mixtures of these substances may also be used.

The impact-resistant styrene resin contains said conjugated diene polymer rubber and said vinyl aromatic hydrocarbon in amounts of 3-12% by weight and 88-97% by weight, respectively. If the content of said conjugated diene polymer rubber is less than 3% by weight, the impact resistance of the composition is insufficient. If it exceeds 12% by weight, the transparency of the composition is injured.

When it is intended to blend the copolymer mixture (A) with the impact-resistant styrene resin to form the composition of this invention, they may be blended together by any known procedure. For example, they may be blended by means of a roll, screw extruder or the like. Alternatively, solutions thereof may first be mixed, followed by evaporating the solvents on a hot drum or by means of a steam stripping to recover the resin.

As mentioned above, the composition of this invention is excellent in impact resistance, and the composition ratio can be varied corresponding to the required balance of physical properties such as impact resistance, transparency, etc. to meet the needs. Therefore, the composition can be used as molding elements for various molded products. That is, the composition of this invention can be extruded, as it is or after being colored, in the same manner as for conventional thermoplastic resins to give sheets or films. Also, it can be molded by thermoforming, such as vacuum forming, pressure forming and the like, into packages for food containers, blister packaging materials, packaging films for vegetables, fruits and cakes, and so on. Thus, the composition of this invention can be used in a broad packaging material field. Further, the composition can also be employed in the production of toys, general merchandise, containers, etc. by the technique of injection molding, blow molding and the like, in the same manner as usual general purpose resins.

DESCRIPTION OF PREFERRED EMBODIMENT

This invention is illustrated by Examples below. It should be understood that this invention is not limited to the Examples.

Example 1 and Comparative Example 1

By the procedure mentioned below, a B-A-B-A type styrene-butadiene block copolymer and an A-B-A type styrene-butadiene block copolymer were simultaneously polymerized in toluene with n-butyllithium as a catalyst to obtain a homogeneous resin composition:

A reaction vessel equipped with a stirrer was previously dehydrated, deaerated and then purged with nitrogen gas. Then, 30% by weight toluene solution of 26 parts by weight of 1,3-butadiene was injected into the reaction vessel. Subsequently, a toluene solution of n-butyllithium was added in an amount of 0.125 part by weight as the active lithium compound, and the monomer was polymerized at 70° C. for 1 hour. After the polymerization of the monomer had substantially been completed, 30% by weight toluene solution of 74 parts by weight of styrene and a toluene solution containing n-butyllithium in an amount of 0.034 part by weight as the active lithium compound were added thereto, and the mixture was polymerized at 70° C. for 1 hour. After the polymerization of the monomer had substantially been completed, 30% by weight toluene solution of 26 parts by weight of 1,3-butadiene was added, and the mixture was polymerized at 70° C. for one hour. After the polymerization had substantially been completed, 30% by weight toluene solution of 74 parts by weight of styrene was added, and the mixture was polymerized at 70° C. for 1 hour. After the polymerization of the monomer had been completed, 0.8 part by weight of 4-methyl-2,6-di-tert-butylphenol was added to the resulting copolymer solution as a polymerization terminator and an antioxidant. The copolymer solution thus obtained was poured into an excess of methanol and the resulting precipitates were collected and dried under reduced pressure. The composition of the block copolymer mixture thus obtained and the results of tests on physical properties are indicated in Table 1.

In this block copolymer mixture, approximately 84% of the chain of copolymer (1) had substantially the same structure as the chain of copolymer (2). The copolymers (1) and (2) had number average molecular weights of about 83,000 and about 70,000, respectively.

This block copolymer was blended with a commercial impact-resistant polystyrene containing about 6% of a conjugated diene rubber, and the physical properties of the blended mixture were measured. The results are also shown in Table 1. The results evidently demonstrate the superiority of the composition of this invention in transparency and impact resistance.

Table 1

| Properties | | | | Example No. | | | | | | |
|---|---|---|---|---|---|---|---|---|---|---|
| | | | | Comp. Ex. 1 | Example 1 | | | | | Comp. Ex. 1 |
| Block copolymer mixture | Copolymer (1) | Structure of polymer | | | B-A-B-A | | | | | |
| | | Styrene content (% by wt.) | | | 71 | | | | | |
| | Copolymer (2) | Structure of polymer | | | A-B-A | | | | | |
| | | Styrene content (% by wt.) | | | 85 | | | | | |
| | Copolymer (1)/Copolymer (2) (wt. ratio) | | | | 4.4/1 | | | | | |
| | Block copolymer mixture/ Impact-resistant polystyrene (wt. ratio) | | | 100/0 | 95/5 | 90/10 | 80/20 | 70/30 | 40/60 | 0/100 |
| Properties of composition | Melt flow index (g/10 min) | | 1) | 4.5 | 4.3 | 4.0 | 3.8 | 3.6 | 2.9 | 2.0 |
| | Tensile strength (kg/cm$^2$) | | 2) | 210 | 208 | 212 | 210 | 207 | 205 | 220 |
| | Tensile elongation at break (%) | | 2) | 200 | 180 | 160 | 135 | 120 | 60 | 35 |
| | Izod impact strength (kg-cm/cm) | | 2) | 3.1 | 4.0 | 4.5 | 6.9 | 8.5 | 8.5 | 7.1 |
| | Rockwell hardness (R-scale) | | 3) | 40 | 50 | 57 | 62 | 75 | 96 | 109 |
| | Bending modulus (kg/mm$^2$) | | 4) | 110 | 125 | 135 | 155 | 162 | 192 | 215 |
| | Haze (%) | | 5) | 4.5 | 8.5 | 12.0 | 20.0 | 60 | White | White |

Notes
1) Measured according to ASTM D-1238-65T, condition G
2) Measured according to JIS K-6871
3) Measured according to ASTM D-785, R-scale
4) Measured according to ASTM D-790
5) Measured according to JIS K-6714 with test pieces having a thickness of 0.5 mm.

Comparative Example 2

Four kinds of block copolymer mixtures were produced by repeating the procedure of Example 1, except that the quantities of butadiene, styrene and catalyst were varied. The copolymers were blended with the same commercial impact-resistant polystyrene as used in Example 1 in a weight ratio of block copolymer to impact-resistant polystyrene of 90/10, and the physical properties of the blends were measured. The results are indicated in Table 2, which evidently demonstrate the superiority of the composition of this invention in transparency and impact resistance.

Example 2

A block copolymer mixture was produced by repeating the procedure of Example 1, except that n-hexane was used as solvent. The solution of block copolymer mixture thus obtained was a stable dispersion and had a low viscosity. The block copolymer mixture was isolated from the solution, it was blended with the same commercial impact-resistant polystyrene as used in Example 1 in a weight ratio of 90/10, and physical properties of the blend were measured. The results are shown in Table 2, which clearly demonstrate the superiority of the composition of this invention in balance of physical properties. The data of Example 1 are also shown in Table 2 for comparison.

for 1.5 hours. After the polymerization of the monomer had substantially been completed, 0.8 part by weight of 4-methyl-2,6-di-tert-butylphenol was added to the formed copolymer solution as a polymerization terminator and an antioxidant. The copolymer solution thus obtained was poured into an excess of methanol, and the resulting precipitates were collected and dried under reduced pressure.

The block copolymer mixture thus obtained had the composition shown in Table 3, and approximately 54% of the copolymer (1) chain was substantially identical Table 2

| Properties | | | | Example No. | | | | | |
|---|---|---|---|---|---|---|---|---|---|
| | | | | | Comparative Example 2 | | | Example 1 | Example 2 |
| Block copolymer mixture | Co-polymer (1) | Structure of polymer | | B-A-B-A | B-A-B-A | B-A-B-A | B-A-B-A | B-A-B-A | B-A-B-A |
| | | Styrene content (% by wt.) | | 62.5 | 65 | 90 | 50 | 71 | 71 |
| | Co-polymer (2) | Structure of polymer | | A-B-A | A-B-A | A-B-A | A-B-A | A-B-A | A-B-A |
| | | Styrene content (% by wt.) | | 85 | 70 | 95 | 90 | 85 | 85 |
| | Copolymer (1)/copolymer (2) (wt. ratio) | | | 1/1 | 2.5/1 | 5/1 | 2/1 | 4.4/1 | 4.4/1 |
| Block copolymer mixture Impact resistant polystyrene (wt. ratio) | | | | 90/10 | 90/10 | 90/10 | 90/10 | 90/10 | 90/10 |
| Properties of composition | Melt flow index (g/10 min) | | 1) | 3.5 | 3.3 | 4.5 | 3.8 | 4.0 | 4.2 |
| | Tensile strength (kg/cm$^2$) | | 2) | 170 | 140 | 280 | 160 | 212 | 220 |
| | Tensile elongation at break (%) | | 2) | 190 | 250 | 5 | 200 | 160 | 155 |
| | Izod impact strength (kg-cm/cm) | | 2) | 4.2 | Unmeasurable (no breakage) | 1.2 | Unmeasurable (no breakage) | 4.5 | 4.4 |
| | Rockwell hardness (R-scale) | | 3) | 38 | Unmeasurable (too soft) | 98 | Unmeasurable (too soft) | 57 | 59 |
| | Bending modulus (kg/mm$^2$) | | 4) | 115 | Unmeasurable (too soft) | 214 | Unmeasurable (too soft) | 135 | 140 |
| | Haze (%) | | 5) | 26.0 | 47.3 | 8.8 | 51.3 | 12.0 | 11.5 |

Notes:
1)–5) are the same as in Table 1.

Example 3 and Comparative Example 3

By the procedure mentioned below, a B-A-B-A type styrene-butadiene block copolymer and a polystyrene were simultaneously produced in cyclohexane with n-butyllithium as a catalyst to obtain a homogeneous resin composition:

A reaction vessel equipped with a stirrer was previously dehydrated, deaerated and purged with nitrogen gas. Into the reaction vessel was injected 30% by weight cyclohexane solution of 32 parts by weight of 1,3-butadiene and 32 parts by weight of styrene. Then, a cyclohexane solution of n-butyllithium was added in an amount of 0.18 part by weight as the active lithium compound, and the mixture was polymerized at 70° C. for 1 hour with stirring. After the polymerization of the monomers had substantially been completed, a cyclohexane solution of 46 parts by weight of butadiene and 20 parts by weight of styrene was added, and the mixture was polymerized at 70° C. for 1 hour. After the polymerization of the monomers had substantially been completed, 270 parts by weight of styrene and a cyclohexane solution containing n-butyllithium in an amount of 0.14 part by weight as the active lithium compound were added and the mixture was polymerized at 70° C.

with the copolymer (2) chain in structure. The copolymers (1) and (2) had number average molecular weights of about 100,000 and about 54,000, respectively.

The block copolymer mixture thus obtained was blended with the same commercial impact-resistant polystyrene as used in Example 1 in the proportion shown in Table 3, and physical properties of the blend were measured. The results are shown in Table 3, which clearly demonstrate the superiority of the composition of this invention in balance of physical properties.

Example 4

A block copolymer mixture was produced by repeating the procedure of Example 3, except that n-hexane was used as solvent. The copolymer mixture obtained was in the form of a stable dispersion having a low viscosity. The copolymer mixture was blended with the same commercial impact-resistant polystyrene as used in Example 1 in a weight ratio of block copolymer to impact-resistant polystyrene of 90/10, and physical properties of the blend were measured. The results are shown in Table 3, which demonstrate that a good composition can be obtained from the block copolymer mixture polymerized in n-hexane.

Table 3

| Properties | | | Example No. | | | |
|---|---|---|---|---|---|---|
| | | | Comp. Ex. 3 | Example 3 | Comp. Ex. 3 | Example 4 |
| Block | Copolymer (1) | Structure of polymer | | B-A-B-A | | B-A-B-A |
| | | Styrene content (% by wt.) | | 70 | | 70 |

Table 3-continued

| Properties | | | | Comp. Ex. 3 | Example 3 | | | Comp. Ex. 3 | | Example 4 |
|---|---|---|---|---|---|---|---|---|---|---|
| Copolymer mixture | Copolymer (2) | Structure of polymer | | | A | | | | | A |
| | | Styrene content (% by wt.) | | | 100 | | | | | 100 |
| | Copolymer (1)/Copolymer (2) (wt. ratio) | | | | 2.4/1 | | | | | 2.4/1 |
| Block copolymer mixture/ Impact resistant polystyrene (wt. ratio) | | | | 100/0 | 95/5 | 90/10 | 80/20 | 70/30 | 30/70 | 90/10 |
| | Melt flow (g/10 min) | | 1) | 8.5 | 8.0 | 7.1 | 6.0 | 5.4 | 3.1 | 7.2 |
| Properties of composition | Tensile strength (kg/cm$^2$) | | 2) | 285 | 280 | 250 | 242 | 240 | 235 | 250 |
| | Tensile elongation at break (%) | | 2) | 40 | 40 | 38 | 37 | 38 | 37 | 35 |
| | Izod impact resistance (kg-cm/cm) | | 2) | 2.2 | 3.0 | 3.8 | 5.6 | 6.8 | 7.7 | 4.0 |
| | Rockwell hardness (R-scale) | | 3) | 82 | 87 | 92 | 95 | 98 | 111 | 91 |
| | Bending modulus (kg/mm$^2$) | | 4) | 175 | 180 | 185 | 193 | 198 | 205 | 183 |
| | Haze (%) | | 5) | 2.12 | 7.0 | 9.6 | 20 | 45 | White | 9.0 |

Notes:
1)-5) are the same as in Table 1.

Comparative Example 4

A styrene-butadiene-styrene block copolymer having a styrene content of 50% by weight was produced in cyclohexane with n-butyllithium as a catalyst. The formed block copolymer had a melt index of 2.5.

The block copolymer was blended with a general purpose polystyrene (abbreviated to GP-PS) having a number average molecular weight of about 150,000 and physical properties of the blend were measured. The results are shown in Table 4. The results demonstrate that the blend of this comparative example is inferior to the composition of this invention in balance of impact-resistance, transparency and other characteristics.

Table 4

| Block copolymer/Polystyrene (wt. ratio) | | | Comp. Ex. 4 | | | |
|---|---|---|---|---|---|---|
| | | | 90/10 | 60/40 | 40/60 | 30/70 |
| Properties of composition | Melt flow index (g/10 min) | 1) | 2.4 | 2.3 | 2.3 | 2.2 |
| | Tensile strength (kg/cm$^2$) | 2) | 150 | 180 | 190 | 210 |
| | Tensile elongation at break (%) | 2) | 400 | 150 | 30 | 15 |
| | Izod impact strength (kg-cm/cm) | 2) | Unmeasurable (no breakage) | 3.5 | 1.9 | 1.0 |
| | Rockwell hardness (R-scale) | 3) | Unmeasurable (too soft) | 30 | 85 | 95 |
| | Bending modulus (kg/mm$^2$) | 4) | Unmeasurable (too soft) | 110 | 150 | 170 |
| | Haze (%) | 5) | 12.5 | 28.5 | 42.5 | 53.5 |

Notes: 1)-5) are the same as in Table 1.

Example 5 and Comparative Examples 5 and 6

By the procedure mentioned below, a B-A-B-A type styrene-butadiene block copolymer and a polystyrene were simultaneously produced in cyclohexane with n-butyllithium as a catalyst to obtain a homogeneous resin composition:

A reaction vessel equipped with a stirrer was previously dehydrated, deaerated and then purged with nitrogen gas. Then, a 20% by weight cyclohexane solution of 28 parts by weight of 1,3-butadiene and 40 parts by weight of styrene was injected into the reaction vessel. Subsequently, a cyclohexane solution of n-butyllithium was added in an amount of 0.227 part by weight as the active lithium compound, and the mixture was polymerized at 70° C. for 1 hour with stirring. After the polymerization of the monomers had substantially been completed, 20% by weight cyclohexane solution of 52 parts by weight of butadiene was added, and the mixture was polymerized at 70° C. for 1 hour. After the polymerization of the monomer had substantially been completed, 20% by weight cyclohexane solution of 280 parts by weight of styrene and a cyclohexane solution containing n-butyllithium in an amount of 0.092 part by weight as the active lithium compound were added, and the mixture was polymerized at 70° C. for 1.5 hours. After the polymerization of the monomer had substantially been completed, a small quantity of methanol was added as a polymerization terminator and then 2 parts by weight of 4-methyl-2,6-di-tert-butylphenol was added as antioxidant. The cyclohexane was distilled off from the formed copolymer solution at an elevated temperature, to obtain a block copolymer mixture.

The block copolymer mixture thus obtained had a composition shown in Table 5, and approximately 60% of the copolymer (1) chain was substantially identical with the copolymer (2) chain in structure. Copolymers (1) and (2) had number average molecular weights of about 90,000 and about 56,000, respectively.

Next, for comparison, B-A-B-A type styrene-butadiene block copolymers having styrene contents of 75% by weight and 80% by weight were produced by repeating the procedure adopted in the above-mentioned production of block copolymer mixture, except that the n-butyllithium catalyst was at once added at the start of polymerization.

Each of the block copolymer mixture and the block copolymers thus obtained was blended with the same commercial impact-resistant polystyrene as used in Example 1 in the proportion shown in Table 5, and physical properties of the blend were measured. The results are indicated in Table 5, which clearly demonstrate the superiority of the composition of this invention in impact-resistance, transparency and balance of physical properties.

Table 5

| Properties | | | | Example 5 | Comp. Ex. 5 | Comp. Ex. 6 |
|---|---|---|---|---|---|---|
| Block copolymer mixture | Copolymer (1) | Structure of polymer | | B-A-B-A | B-A-B-A | B-A-B-A |
| | | Styrene content (% by wt.) | | 75 | 75 | 80 |
| | Copolymer (2) | Structure of polymer | | A | GP-PS 6) | — |
| | | Styrene content (% by wt.) | | 100 | 100 | — |
| | | Copolymer (1)/Copolymer (2) (wt. ratio) | | 4/1 | 4/1 | — |
| Styrene content of block copolymer mixture (% by wt.) | | | | 80 | 80 | — |
| Block copolymer mixture or block copolymer /Impact-resistant polystyrene (wt. ratio) | | | | 85/15 | 85/15 | 85/15 |
| Melt flow index (g/10 min) | | | 1) | 5.3 | 4.8 | 5.0 |
| Tensile strength (kg/cm$^2$) | | | 2) | 250 | 239 | 255 |
| Tensile elongation at break (%) | | | 2) | 33 | 30 | 21 |
| Izod impact strength (kg-cm/cm) | | | 2) | 4.3 | 3.3 | 2.9 |
| Rockwell hardness (R-scale) | | | 3) | 93 | 92 | 97 |
| Bending modulus (kg/mm$^2$) | | | 4) | 192 | 185 | 200 |
| Haze (%) | | | 5) | 14 | 20 | 16 |

Notes:
1)-5) are the same as in Table 1.
6) A commercial polystyrene having number average molecular weight of ca. 150,000 was used.

Example 6 and Comparative Example 7

A B-A-B-A type styrene-butadiene block copolymer having a styrene content of 75% by weight and a number average molecular weight of about 92,000 was produced in cyclohexane with n-butyllithium as catalyst. In the same manner as above, A-B-A type styrene-butadiene block copolymers having styrene contents of 90% by weight, 83% by weight and 77% by weight and having a number average molecular weight of about 64,000 were produced in cyclohexane with n-butyllithium as a catalyst. The first block copolymer was blended with each of the second block copolymers in the proportion of 2:1 to obtain the three kinds of block copolymer mixtures shown in Table 6.

Then, each of these block copolymer mixtures was blended with the same commercial impact-resistant polystyrene as used in Example 1, and physical properties of the blend were measured. The results are shown in Table 6, which clearly demonstrate that the compositions in which the styrene contents of the components, constituting the copolymer mixture, fall in the ranges specified by this invention are better than the other compositions because of the superiority in transparency.

The impact strengths of the compositions obtained in Examples 1-6 and Comparative Examples 1-7 were plotted against their hazes on a graph, where the impact strength was taken as abscissa and the haze was taken as ordinate (logarithmic scale). The relation thus obtained is shown in the drawings attached which clearly demonstrate that the compositions of this invention are superior to the compositions of the Comparative Examples in balance of transparency and impact resistance.

What is claimed is:

1. A resin composition comprising (A) 75-98 parts by weight of a block copolymer mixture of a vinyl aromatic hydrocarbon and a conjugated diene and (B) 25 - 2 parts by weight of an impact-resistant styrene resin, wherein said copolymer mixture (A) is a mixture of:

(1) a copolymer consisting of at least one vinyl aromatic hydrocarbon polymer block and at least one conjugated diene polymer block, and having a vinyl aromatic hydrocarbon content of 55–85% by weight and a number average molecular weight of about 10,000 to about 500,000, and (2) a homopolymer of vinyl aromatic hydrocarbon or a copolymer consisting of at least one vinyl aromatic hydrocarbon polymer block and at least one conjugated diene polymer block, and having a vinyl aromatic hydrocarbon content of 75% by weight or more which is at least 5% by weight higher than that of the copolymer (1), said copolymer and said homopolymer both having a number average molecular weight of about 500 to about 130,000,

Table 6

| Properties | | | | Example 6 | Comp. Ex. 7 | |
|---|---|---|---|---|---|---|
| Block copolymer mixture | Copolymer (1) | Structure of polymer | | B-A-B-A | B-A-B-A | B-A-B-A |
| | | Styrene content (% by wt.) | | 75 | 75 | 75 |
| | Copolymer (2) | Structure of polymer | | A-B-A | A-B-A | A-B-A |
| | | Styrene content (% by wt.) | | 90 | 83 | 77 |
| | | Copolymer (1)/Copolymer (2) (wt. ratio) | | 2/1 | 2/1 | 2/1 |
| Block copolymer mixture /Impact-resistant polystyrene (wt. ratio) | | | | 85/15 | 85/15 | 85/15 |
| Melt flow index (g/10 min) | | | 1) | 5.1 | 4.8 | 4.5 |
| Tensile strength (kg/cm$^2$) | | | 2) | 251 | 236 | 225 |
| Tensile elongation at break (%) | | | 2) | 31 | 37 | 45 |
| Izod impact strength (kg-cm/cm) | | | 2) | 4.5 | 4.8 | 5.1 |
| Rockwell hardness (R-scale) | | | 3) | 91 | 87 | 67 |
| Bending modulus (kg/mm$^2$) | | | 4) | 190 | 181 | 168 |
| Haze (%) | | | 5) | 16 | 20 | 32 |

Notes:
1)-5) are the same as in Table 1.

the weight ratio of said copolymer (1) to said homopolymer or copolymer (2) in said mixture being 1.5/1 or more, said copolymer (1) and said copolymer (2) being both obtained by polymerization with an organolithium compound as a catalyst in an inert organic solvent, and wherein said impact-resistant styrene resin (B) is a graft-copolymer of 97 to 88% by weight of a vinyl aromatic hydrocarbon on 3–12% by weight of a rubbery conjugated diene polymer.

2. A resin composition according to claim 1, wherein said copolymer mixture is obtained in an inert organic solvent by (i) polymerizing with an organolithium compound catalyst the vinyl aromatic hydrocarbon and the conjugated diene in a weight ratio of 0/100 to 60/40 in an amount of 1 to 80% by weight based on the total weight of the monomers to be used in all the steps to prepare:

(a) an active polymer of the conjugated diene, or (b) an active polymer consisting of a random copolymer of the conjugated diene and the vinyl aromatic hydrocarbon, or (c) an active polymer consisting of at least one vinyl aromatic hydrocarbon polymer block and at least one conjugated diene polymer block, and then (ii) adding the residual vinyl aromatic hydrocarbon and conjugated diene in a weight ratio of 100/0 to 75/25, and a fresh organolithium compound to the active polymer obtained in (i), and continuing the polymerization to prepare:

(d) a homopolymer of vinyl aromatic hydrocarbon or (e) a copolymer consisting of at least one vinyl aromatic hydrocarbon polymer block and at least one conjugated diene polymer block, while prolonging the chain of the copolymer obtained in (i).

3. A resin composition according to claim 1 or 2, wherein said inert solvent is composed mainly of an aliphatic hydrocarbon.

4. A resin composition according to claim 3, wherein said aliphatic hydrocarbon is n-hexane, n-pentane or isopentane.

5. A resin composition according to claim 1 or 2, wherein said inert solvent is cyclohexane.

6. A resin composition according to claim 1 or 2, wherein said vinyl aromatic hydrocarbon is styrene, o-methylstyrene, m-methylstyrene, p-methylstyrene, α-methylstyrene, dimethylstyrene or a mixture thereof and said conjugated diene is 1,3-butadiene, isoprene or a mixture thereof.

7. A resin composition according to claim 1, wherein said copolymer (2) constituting the copolymer mixture (A) is a copolymer which is obtained by polymerization in an inert solvent with an organolithium compound as a catalyst; which consists of at least one vinyl aromatic hydrocarbon polymer block and at least one conjugated diene polymer block; which has a vinyl aromatic hydrocarbon content of 75% by weight which is at least 5% by weight higher than that of the copolymer (1); and which has a number average molecular weight of about 500 to about 130,000.

8. A resin composition according to claim 1, 2 or 7, wherein the vinyl aromatic hydrocarbon content of the copolymer (2) is 10% by weight higher than the vinyl aromatic hydrocarbon content of copolymer (1).

9. A resin composition according to claim 1, 2 or 7, wherein the copolymer (1) constituting the copolymer mixture (A) has a molecular weight of about 30,000 to about 300,000 and the copolymer (2) constituting the copolymer mixture (A) has a molecular weight of about 10,000 to about 100,000.

10. A resin composition according to claim 9, wherein the copolymer (2) has a number average molecular weight of 10,000 to 80,000.

11. A resin composition according to claim 1, 2 or 7, wherein at least 35% of the chain of the copolymer (1) is substantially identical with the chain of the copolymer (2) in structure.

12. A resin composition according to claim 1 or 2, wherein said organolithium compound is n-butyllithium or sec-butyllithium.

* * * * *